(12) United States Patent
French et al.

(10) Patent No.: US 9,785,971 B2
(45) Date of Patent: Oct. 10, 2017

(54) PRIORITISING ADVERTISEMENTS FOR A LOCATION

(71) Applicant: International Business Machines Corporation, Armonk, NY (US)

(72) Inventors: Paul B. French, Cork (IE); Jack J. Healy, Cork (IE); Niall J. Lucey, Cork (IE); Michael Truss, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/421,212

(22) PCT Filed: Oct. 5, 2013

(86) PCT No.: PCT/IB2013/053799
§ 371 (c)(1),
(2) Date: Feb. 12, 2015

(87) PCT Pub. No.: WO2014/027255
PCT Pub. Date: Feb. 20, 2014

(65) Prior Publication Data
US 2016/0012483 A1    Jan. 14, 2016

(30) Foreign Application Priority Data
Aug. 14, 2012  (GB) .................................. 1214453.1

(51) Int. Cl.
*G06Q 30/02*   (2012.01)
(52) U.S. Cl.
CPC ......... *G06Q 30/0259* (2013.01); *G06Q 30/02* (2013.01); *G06Q 30/0261* (2013.01); *G06Q 30/0269* (2013.01)

(58) Field of Classification Search
CPC ....................... G06Q 30/0207; G06Q 30/0241
(Continued)

(56) References Cited

U.S. PATENT DOCUMENTS 7,676,400 B1    3/2010  Dillon
2007/0179846 A1    8/2007  Jain et al.
(Continued)

FOREIGN PATENT DOCUMENTS

CN    101268483 A    9/2008

OTHER PUBLICATIONS

International Search Report and Written Opinion, International Application No. PCT/IB2013/053799, International Filing Date May 10, 2013, 6 pages.
(Continued)

*Primary Examiner* — Sam Refai
(74) *Attorney, Agent, or Firm* — Mark G. Edwards

(57) ABSTRACT

A mechanism is provided for prioritizing advertisements for a location. The mechanism identifies one or more person at the location and identifies a set of advertisements associated with a set of products for the location. The mechanism determines a score for the one or more persons indicating their likelihood to promote or detract from each of the set of products. The mechanism prioritizes the advertisements in the set according to the aggregate scores of the one or more persons for the products of the advertisements. The mechanism identifies a target person at the location to which the advertisement is to be directed and wherein determining a score of the one or more persons excludes or weights the target person.

10 Claims, 4 Drawing Sheets

(58) Field of Classification Search
USPC .......................................... 705/14.1–14.73
See application file for complete search history.

(56) References Cited

U.S. PATENT DOCUMENTS

| | | |
|---|---|---|
| 2008/0052413 A1 | 2/2008 | Wang et al. |
| 2009/0070443 A1 | 3/2009 | Vanderhook et al. |
| 2009/0171748 A1 | 7/2009 | Aven et al. |
| 2009/0228335 A1 | 9/2009 | Niyogi et al. |
| 2010/0010822 A1 | 1/2010 | Bal et al. |
| 2010/0042426 A1 | 2/2010 | Cates |
| 2011/0060643 A1 | 3/2011 | Davis et al. |
| 2011/0106630 A1* | 5/2011 | Hegeman ............... G06Q 30/02 705/14.71 |
| 2011/0191417 A1 | 8/2011 | Rathod |
| 2011/0264508 A1 | 10/2011 | Harik et al. |
| 2012/0232998 A1* | 9/2012 | Schoen ............... G06Q 10/10 705/14.66 |
| 2013/0054559 A1* | 2/2013 | Pettit ............... G06F 17/30 707/709 |
| 2013/0080260 A1 | 3/2013 | French et al. |

OTHER PUBLICATIONS

"Measuring your Net Promoter Score", http://www.netpromotersystem.com/about/measuring-your-net-promoter-score.aspx, retrieved from the internet on Jan. 14, 2015, 2 pages.

Callari, Ron, "Flip.to Identifies Net Promoters & Streamlines Reviews on Hotel Websites", http://inventorspot.com/articles/flipto_identifies_net_promoters_streamlines_reviews_hotel_websit, retrieved from the internet on Jan. 14, 2015, 4 pages.

Curran, Kevin et al., "Advertising on Facebook", International Journal of E-Business Development (IJED) vol. 1 Issue 1, Nov. 2011, pp. 26-33.

Provost, Foster et al., "Audience Selection for On-Line Brand Advertising: Privacy-friendly Social Network Targeting", KDD'09 Jun. 28-Jul. 1, 2009, Paris, France, 9 pages.

Steel, Emily, "Visa's Blueprint for Targeted Advertising", http://blogs.wsj.com/digits/2011/10/24/visas-blueprint-for-targeted-advertising/, Oct. 24, 2011, 3 pages.

Sterling, Greg, "Has Google Just Patented Geo-Targeting?", http://searchengineland.com/has-google-just-patented-geo-targeting-37111, Mar. 2, 2010, 9 pages.

* cited by examiner

PRIORITISING ADVERTISEMENTS FOR A LOCATION

BACKGROUND

This invention relates to the field of providing advertisements at a location. In particular, the invention relates to prioritising advertisements for a location.

Product sales are highly influenced by consumer-to-consumer communication regarding the product. When one or more consumers recommend a product to another consumer, then the probability of a purchase is increased. When one or more consumers deprecate a product to another customer then the probability of a purchase is decreased.

Companies focus on increasing the number of consumers who are promoters, and decreasing those who are deprecators. They do this by providing better products, improving the effectiveness of addressing consumer complaints, offering compensation for poor product experience, etc. With increased promoters and fewer deprecators, a potential new consumer for the product is more likely to hear a recommendation and less likely to hear a deprecation.

However, in advertising there are unfortunate incidents. For example, products may be blindly advertised to persons in the presence of detractors—thus backfiring in that the product-recommendation in the advertisement is more than negated by the probability that it prompts the product-detracting conversation between the persons present.

There may also be missed opportunities. For example, products are no more likely to be advertised to persons in the presence of promoters than at any other time. Thus, the opportunity to prompt a recommendation-conversation between the persons present is largely unexploited.

Therefore, there is a need in the art to address the aforementioned problems.

SUMMARY

According to a first illustrative embodiment, there is provided a method for prioritizing advertisements for a location, comprising: identifying one or more persons at the location; identifying a set of advertisements associated with a set of products for the location; determining a score for the one or more persons indicating their likelihood to promote or detract from each of the set of products; and prioritizing the advertisements in the set according to the aggregate scores of the one or more persons for the products of the advertisements.

According to another illustrative embodiment, there may be provided a system for prioritizing advertisements for a location, comprising: a person identifying component for identifying one or more persons at the location; a candidate advertisement component for identifying a set of advertisements associated with a set of products for the location; a score retrieving component for determining a score for the one or more persons indicating their likelihood to promote or detract from each of the set of products; and a prioritizing component for prioritizing the advertisements in the set according to the aggregate scores of the one or more persons for the products of the advertisements.

According to another illustrative embodiment, there is provided a computer program product for prioritizing advertisements for a location, the computer program product comprising a computer readable storage medium having computer-readable program code embodied therewith, the computer-readable program code configures to: identify one or more persons at the location; identify a set of advertisements associated with a set of products for the location; determine a score for the one or more persons indicating their likelihood to promote or detract from each of the set of products; and prioritize the advertisements in the set according to the aggregate scores of the one or more persons for the products of the advertisements.

The described aspects of the invention provide the advantage of automatically delivering an advertisement to a potential customer in a favourable environment for recommendation by other people and automatically preventing the delivery of an advertisement to a potential customer in an environment favouring a detraction by other people. This would have value to suppliers of products whose sales could be increased by more efficient targeting of advertisements to customers.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

Figure 1A:
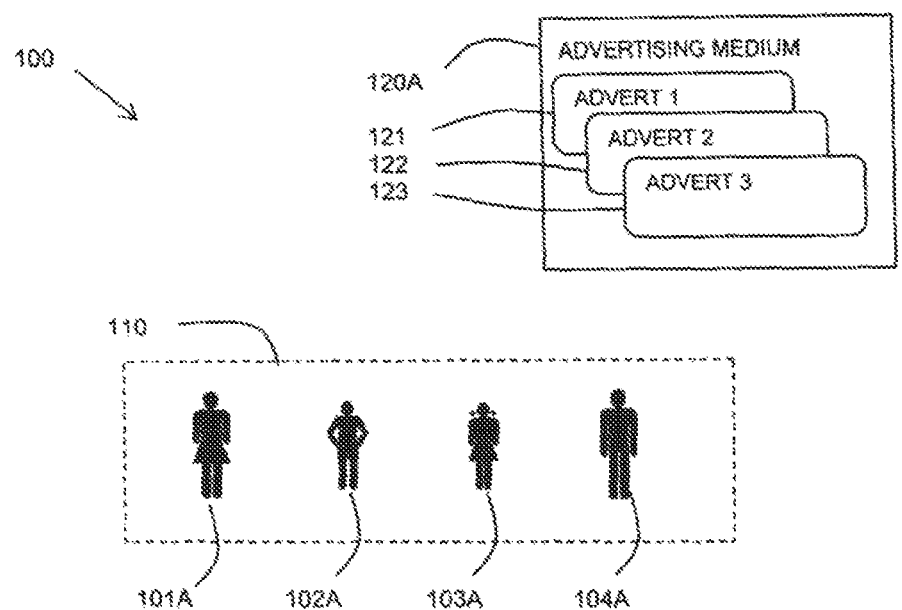
FIGS. 1A and 1B are schematic diagrams of two embodiments of a system in accordance with an illustrative embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described, in detail so as not to obscure the present invention.

Method and system are provided for automatic prioritisation of advertisements for display at a location based on the extent to which persons present at that location are likely to recommend or deprecate the product to those targeted. Person to person product recommendations are prompted by playing the advertisement when and where persons present are likely to recommend the product. Person to person product detractions are avoided by not playing the advertisement when and where persons present are likely to detract from the product. In this way, the effectiveness of the advertisements (e.g. resulting in a sale) is increased.

Display of an advertisement may include many different forms. For example, a static display including images and/or text, playing a video, playing of audio, or sending data including text, audio, video and/or images. Display may also include touch display, for example, braille.

Display of an advertisement may also include emitting a scent. For example, if two consumers are passing a store booth that sells perfume and it has a system that can emit one of many scents on demand, it might see that one of those persons likes that scent and it might emit that scent to increase the probability that that person will recommend the emitted scent to the other person present.

Display of an advertisement may also include environmental adaptation. For example, making it hotter or colder perhaps to increase the possibility of recommending a particular portable electric heater brand.

Additionally, where the advertisement is targeted at specific persons at that location (for example, by specific delivery via a personal device such as a mobile phone), it would be the probability that other persons present would recommend or deprecate the product that would be considered.

The "location" may be physical (for example, persons walking by an electronic billboard, at a cinema, or watching television in the same room). The "location" may also be a virtual location (for example, persons in communication in an internet chat-room).

When and where an opportunity exists for displaying advertisements, there are generally more candidate advertisements than will fit in that opportunity. This may be to fit within a given time or within a given space. Therefore, it is advantageous for the candidate advertisements to be prioritised to determine which ones to play in that opportunity.

The described method and system prioritises advertisements based on a value or score of the likelihood of promotion/detraction of persons present at the same time in the same location where the advertisement is a candidate to be played.

Advertisements that are candidates to be played at a certain location at a certain time may be prioritised based on a score of the likelihood of recommendation or detraction by persons present at the location of an advertised product. This score is referred to as a promotion/detraction likelihood score for a product.

For example, Net Promoter Score (NPS) (Net Promoter Score and NPS are trade marks of Fred Reicheld and Satmetrix Systems, Inc.) is a known methodology for measuring customer loyalty. The main idea of the methodology is that customer loyalty can best be predicted by the answer to a single question—"How likely are you to recommend (company name/product) to a friend or colleague?" Respondents answer on a scale of 0 (not at all likely) to 10 (extremely likely). Based on the response to this question, respondents are categorized as Promoters (9-10), Passives (7-8) or Detractors (0-6). A company's or product's Net Promoter Score is the percentage of Promoters minus the percentage of Detractors.

Many companies believe and invest in improving their Net Promoter Score, as a means to becoming more successful and customer focused. This belief is based on the assumption that the more individuals who say they are "likely to recommend a company/product to a friend or colleague," the more successful the product is likely to be. An impartial personal recommendation has always been acknowledged as the best route to success for a product, so if a good Net Promoter Score increases the likelihood of impartial recommendations, it makes good sense to work on improving a company's Net Promoter Score.

Alternatives to the Net Promoter Score include the Net Endorser score of the Company Health Check Index of Red Shift Research and other measures of likelihood of recommending or detracting from a product.

Additionally, an estimated score of the promotion/detraction likelihood score (estimated from other metrics about the relationship of the consumer with the company and/or product) may be used when a classic NPS (or equivalent) is not available.

The media by which advertising may occur include but are not limited to: television, radio, handsets, computers, route navigation devices, cell phones, cinema, Internet, instant messaging, bill boards, voice services, text services, etc.

The method used to determine the co-presence of net promoters and target audience may include existing (and consented to) smart phone and Internet tracking services, and many other forms, for example, including facial recognition.

Figure 1B:
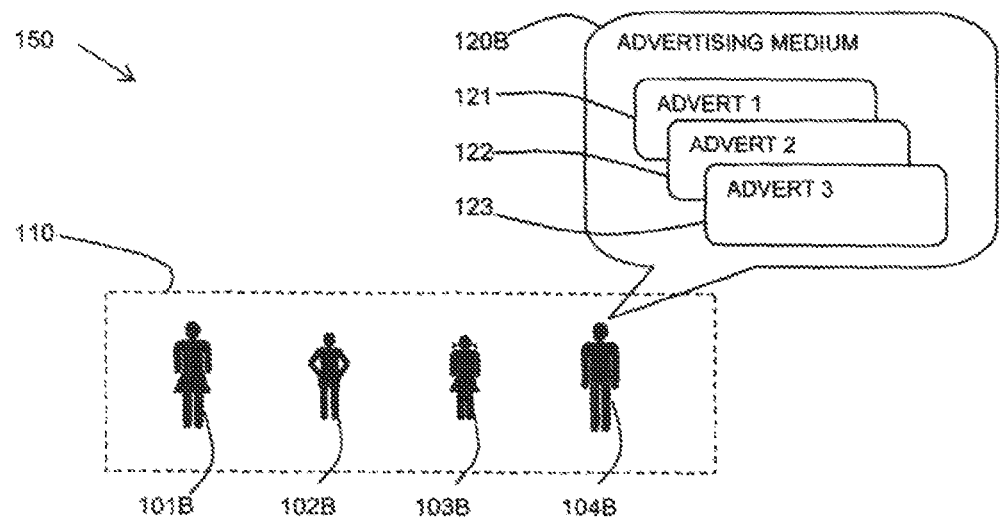

Referring to FIGS. 1A and 1B, schematic diagrams 100, 150 show embodiments of the described system.

Referring to FIG. 1A, multiple people 101A-104A may be at a given location 110. An advertising medium 120A may be provided at the location 110 with multiple candidate advertisements 121-123 to be played at a given time. The described system provides a method for automatically prioritising the candidate advertisements 121-123 based on a determination of whether the persons 101A-104A present at that location are likely to recommend or deprecate the advertised product to those targeted.

Referring to FIG. 1B, a similar scenario is shown, however the advertising medium 120B is direct specifically to a target person 104B at the location 110. The described system in this scenario provides a method for automatically prioritising the candidate advertisements 121-123 based on a determination of whether the persons 101B-103B present at that location other than the target person 104B are likely to recommend or deprecate the advertised product to the target person 104B.

Figure 2:
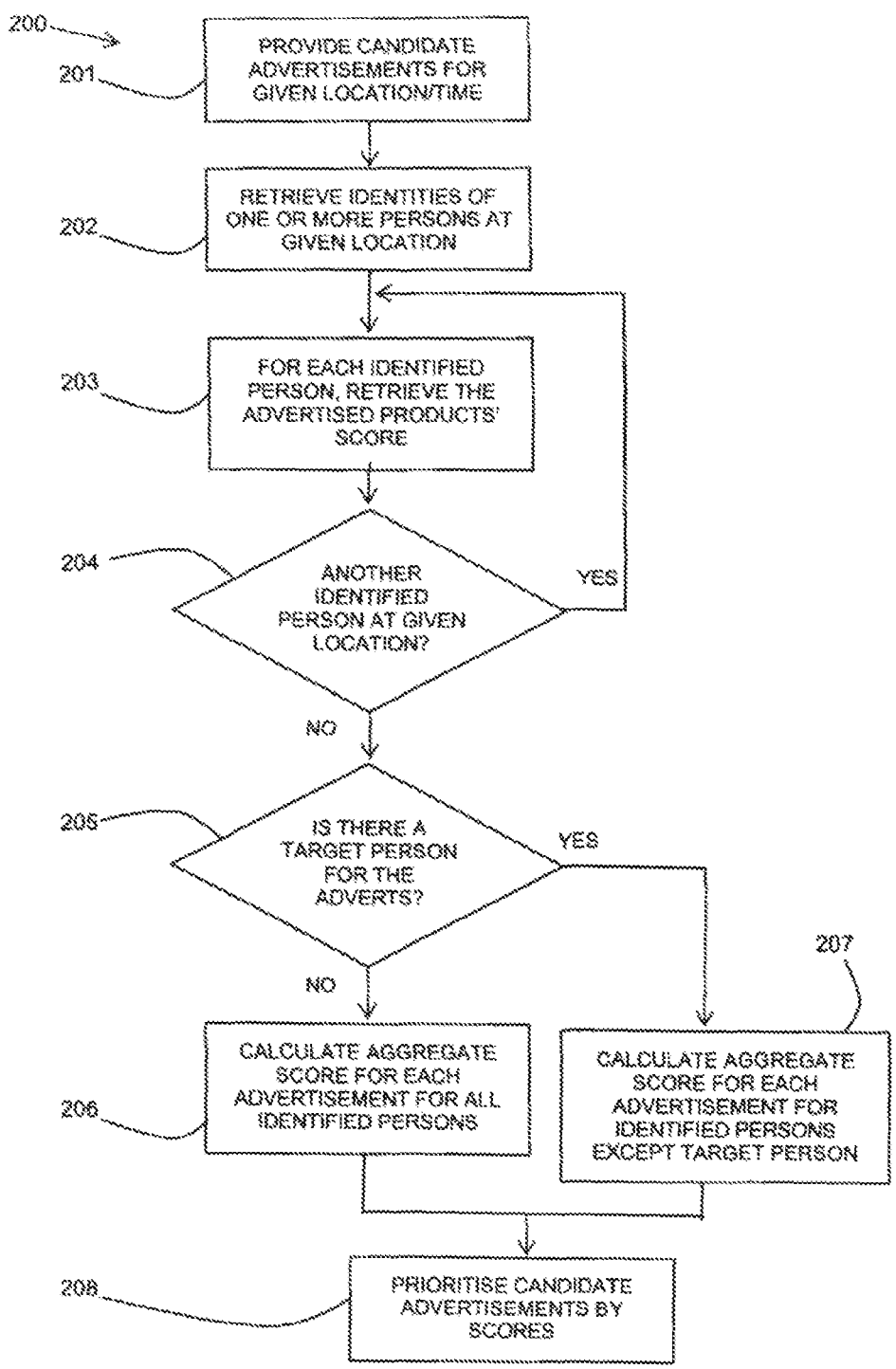
FIG. 2 is a flow diagram of an example embodiment of a method in accordance with an illustrative embodiment.

Referring to FIG. 2, a flow diagram 200 shows an example embodiment of the described method.

Candidate advertisements may be provided or identified 201 for a given advertising location and time.

Identities of one or more persons present at the location may be retrieved 202. This may be done in many different ways. For example, physical locations may contain persons wearing mobile phones where the persons have previously elected to reveal their location as part of some opt-in service. In another example, persons in the same Internet chat room may have been authenticated at login. In a further example, persons on an audio conference call will have been identified via their caller-ID. The identities of persons present at a physical location may be obtained by querying a location-based-services server from a telecom service provider.

For each identified person (if any), a promotion/detraction likelihood score (for example, the Net Promoter Scores (NPS)) may be obtained 203 for each product being advertised in the candidate advertisements. The score may be obtained from the companies advertising the products, for example, by querying a database supplied by the company advertising the product.

It may be determined 204 if there is another identified person at the given location. If so, the method may loop to obtain 203 the promotion/detraction likelihood scores for that person. Otherwise, the method may proceed.

It may then be determined 205 if there is a target person for the advertisement (as described with reference to FIG. 1B).

If there is no target person for the advertisement, then aggregate promotion/detraction likelihood scores of the persons present for each candidate advertisement may be calculated 206.

If there is a target person for the advertisement, the method may calculate 207 the aggregate promotion/detraction likelihood scores of the persons present for each candidate advertisement but disregarding, or apply a configured more or less weight to, the promotion/detraction likelihood score of any person present who has been specifically identified as a potential purchaser of the product to be advertised. This is because this is the person that is the likely target of recommendations or detractions from the other persons present. More weight may be added to persons present closest to the target person.

The candidate advertisements may be prioritised 208 by the aggregate promotion/detraction likelihood scores, where the candidate advertisement with highest aggregate promotion/detraction likelihood score is assigned highest priority.

At this point the system may continue with a pre-existing function to present the highest-priority advertisements that fit in the advertising opportunity.

Additional features may be provided to enhance the scoring process.

Prioritisation of candidate advertisements may be enhanced to consider other prioritisation factors in combination with the prioritisation based on the aggregate promotion/detraction likelihood score of the advertisement. The method may apply different (configured) weights to the different factors to compute the overall priority. As well as addressing the complex case of different prioritisation factors, this may also address the simple boundary case where promotion/detraction likelihood score is not a factor because there is no score data available (and so it should carry no weight in determining the overall prioritisation).

Other prioritisation factors may depend on categories of person recommending/detracting the product. For example, people are more influenced by certain people depending on the product. Women may be more influenced by women for baby products; men may be influenced more by men for car products.

Further prioritisation factors may include a category of the target person or information regarding the target person. For example, the targeted person falls into a category likely to purchase the product, or information that the targeted person has recently purchased other products which the advertised product would complement.

In another embodiment, the extent of the relationships between persons present may be determined (for example, by automatically checking to see if they are friends on social networking sites, textual analysis of Internet communication, analysis of telephony call detail records, etc.). Once determined, it may also be used to weight the influence of each person's promotion/detraction likelihood score in determining the aggregate score.

In a further embodiment, each advertisement may have configured properties influencing the determination of the aggregate promotion/detraction likelihood score. For example, one advertisement might be configured such that one low score would have a much greater influence on the aggregate score than a number of high scores also included in the group. For example, this may meet an advertiser's request along the lines of "I'd rather it not be played if there is even one detractor present."

The temporary mood or emotional state of potential product promoters may influence the probability and extent to which they will promote the product. A further embodiment may compute a temporary mood-altered promotion/detraction likelihood score for each person whose score has been retrieved. The mood-altered score may be computed by increasing or decreasing the score based on the mood or emotional state of the person and this altered score would then be the promotion/detraction likelihood score used in the scoring. The mood or emotion of a person may be determined by prior consent of persons by measuring human metrics from physiological sensors at the location. Physiological sensors may physically monitor a person's biological metrics, for example, via a sensor touching the skin measuring skin temperature, moisture, and conductivity, or via a camera recording and interpreting facial expressions or body language. Other human metrics may be gathered include social network information which may indicate a consumer's emotional state. Access to social network information must be consented to by the person.

Additionally, the mood/embodiment aspect may be further enhanced such that the promotion/detraction likelihood score of a person present is temporarily altered not just by the mood of that person, but is also further altered in the same fashion by the aggregated mood of the group of persons present. Thus, in calculating the person's mood-altered score, the system may account for the extent to which a person's effectiveness of promoting or deprecating a product is additionally influenced by the mood of other persons present. This also addresses the case where there might not be any promotion/detraction likelihood score data available for some or all of those other persons present.

When the advertisement is played, the method may automatically update the company's promotion/detraction likelihood score database with a record of the persons present. The company may also record product sales in the database. The aggregate score for the group of persons present may then be determined by weighting the promotion/detraction likelihood score of each person based on their historical track record of influencing such sales in the same or similar situations.

This may be further enhanced by considering the extent to which each person present has historically influenced the purchasing decisions of each other person present, and thus weighting differently the promotion/detraction likelihood score based on the net influence of each relationship. The extent to which each of the persons present were previously present at another opportunity to recommend the product, and that previous opportunity resulted, or did not result, in a sale of that product to another person present at that previous time may be considered. Further, the relationship with any person present who has been specifically identified as a potential purchaser of the product may be given a still greater weight in the determination of the aggregate promotion/detraction likelihood score.

The described method may include advertisements via solicitation calls (for example, cold calling). For example, a utility company might have its customer care personnel cold-call potential new customers, and would have such customers automatically identified by a telephony call distribution system. Such a system may query a location-based-service to determine if anybody else is present at that location. The utility company may have a database with the promotion/detraction likelihood score of that other person, and then the call distribution system might prioritised the outgoing call to the prospective new customer which has a net promoter also present at the same location.

Figure 3:
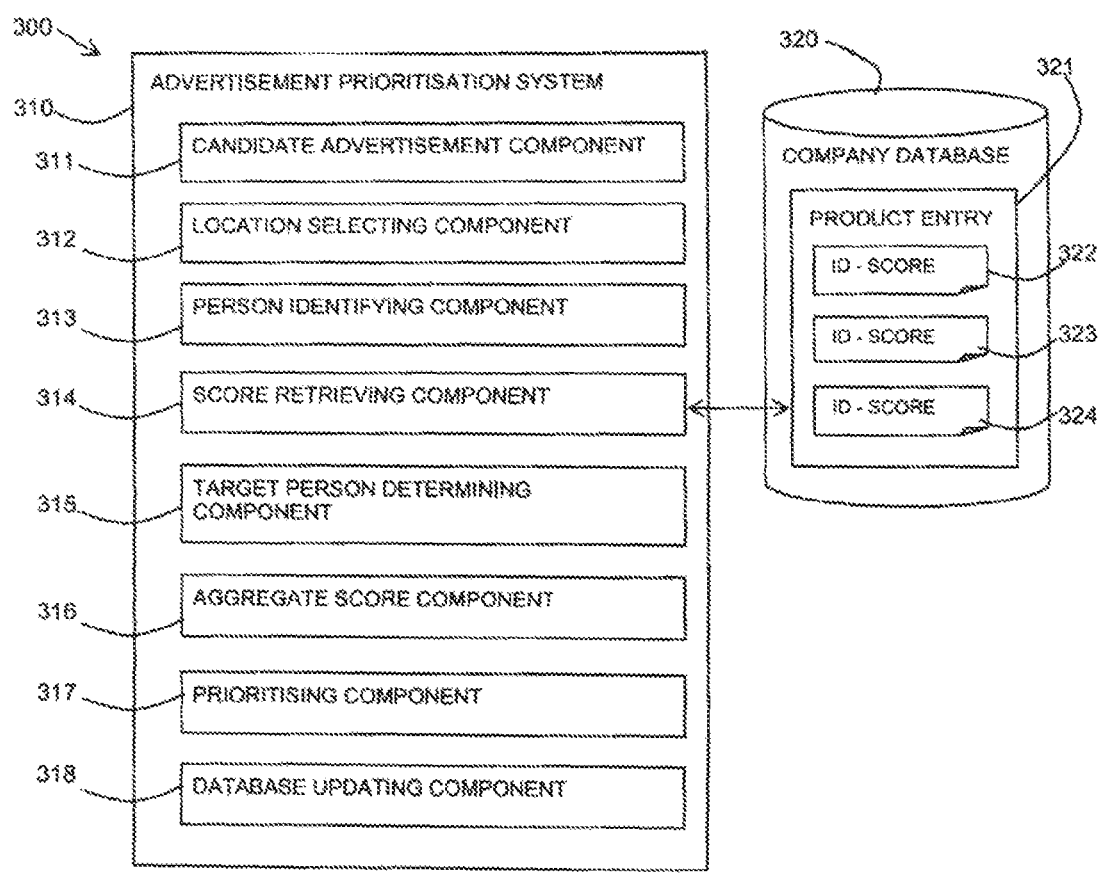
FIG. 3 is block diagram of an example embodiment of a system in accordance with an illustrative embodiment.

Referring to FIG. 3, a block diagram shows an example embodiment of the described system 300.

An advertisement prioritization system 310 may be provided including a candidate advertisement component 311 for providing multiple candidate advertisements for a given location and time for advertised products. A location selecting component 312 may select a given location at which an advertisement is to be displayed or played.

A person identifying component 313 may be provided to identify persons at the given location. This may be done in various ways as described in relation to FIG. 2, including optionally accessing a location-based-services server.

A score retrieving component 314 may be provided to retrieve for each identified person a promotion/detraction likelihood score, for example, a Net Promoter Score (NPS) (if available) for each product being advertised in the candidate advertisements. These scores may be retrieved from the company databases 320 of the companies advertising or selling the products being advertised. Each product may have a database entry 321 with scores for recorded individuals 322, 323, 324.

A target person determining component may be provided 315 to determine if there is a target person at the location to whom the advertisement is to be directed.

An aggregate score component 316 may be provided for aggregating the retrieved promotion/detraction likelihood scores of the persons at the location. This may not include any score of a targeted person. A weighting may be provided for weighting the scores of the individuals.

The weighting may include various factors. For example, relationships between the persons present may be a factor. This may be determined from social networking data. In another example, each advertisement may have pre-defined properties for weighting of the scores. A further embodiment may use the mood or emotion of the persons to weight the scores.

A prioritizing component 317 may prioritize the candidate advertisements according to the aggregate, and optionally weighted, score. Additional prioritizing factors may also be included.

A database updating component 318 may be provided to update the company databases 320 with a record of persons present and any product sales that result. This history may be used in future weighting of the scores.

Figure 4:
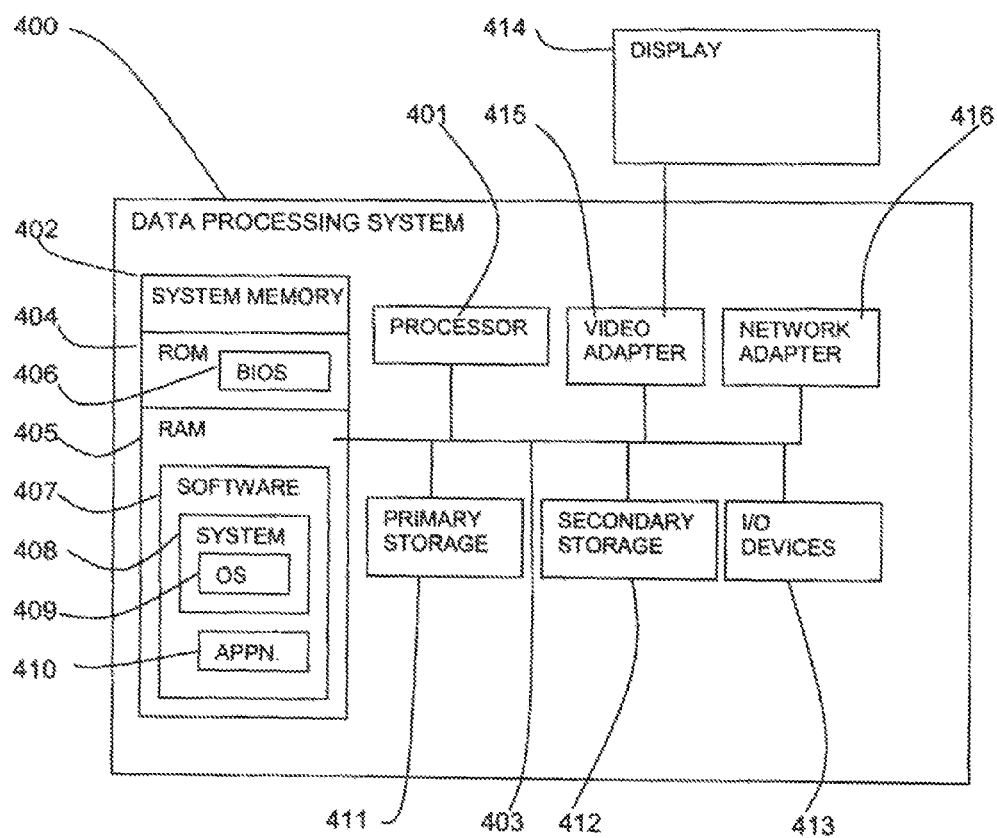
FIG. 4 is a block diagram of an embodiment of a computer system in which aspects of the illustrative embodiments may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including system software 408 further including operating system software 409. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Further embodiment and examples are given below based on the alternative forms of location and delivery of the advertisements.

In one embodiment, advertising is to persons at a common physical location. This is described in detail above.

In another embodiment, advertising is to persons at a common virtual location, where that location may be an Internet chat room, virtual meeting, or other form of virtual location. The same steps are followed as with the embodiment at a physical location, with the following qualifications.

Some advertisements are candidates to be displayed to all persons present in the virtual location (for the purpose of prompting product-recommendation-discussion). Other advertisements may be displayed to a selected group or individual of the persons present.

The identities of the persons present in the virtual location may be determined by their identities provided as condition of access to that virtual location, and any association to other identifying attributes they have opted to share (for example, email account, social network identity, mobile number, name, address, etc.).

The system controlling the virtual location (e.g. the server at the website location) may initiate the promotion/detraction likelihood score queries, perform the calculations, and select the advertisements to be played, based on the algorithms described.

In a further embodiment, displaying an advertisement may be by "cold" sales-solicitation calling to persons at a common physical location (i.e. call him now as the other persons present are net promoters, or call him at another time as the persons present are net detractors).

A customer service representative (CSR) working for a utility company is considered. The number of incoming calls goes down and there is an opportunity for the CSR to place an outing sales solicitation call. A system at the utility company premises, automatically selects the telephone number to call, places the call, and provides the CSR with the relevant information it has on the solicitation-target-consumer. The solicitation-target-consumer clearly has to be a prospective customer (there are many ways to determine that, for example, has a landline telephone and is not presently a customer). Say the candidate solicitation-target-consumers are Paul and Niall. Mick is presently visiting Paul (they are co-located). Mick is a net detractor of the utility. Jack is presently visiting Niall (they are co-located). Jack is a promoter of the utility. It would be much more effective to solicit Niall right now because it may prompt a recommendation from Jack. It would be much less effective to solicit Paul right now because it may prompt a detraction from Mick.

The system of this cold calling embodiment may follow the method of selection of advertisements, except that, in this case, the "advertisement" is a human to human sales-solicitation where the system automatically selects the target based on the steps described.

In this embodiment, it may be that the outgoing call distribution system initiates the promotion/detraction likelihood score queries, performs the calculations, and selects the sales-solicitation targets.

Another variation of this embodiment is the case where the sales solicitation is performed by calling at a person's door, or even walking up to people in a public area. In this case, a centralized dispatch system, which remotely directs a travelling sales representative, would initiate the promotion/detraction likelihood score queries, perform the calculations, and select the sales-solicitation targets.

In a further embodiment, advertising may be to persons involved in a telephony call (voice or multi-media) based on the promotion/detraction likelihood scores of other persons on the call. This embodiment may include the case where the advertising is played to the caller in advance of the call being answered (e.g. in place of ringback) or in advance of other steps prior to end to end connection.

This telephony embodiment is similar to the embodiment of a virtual location case described above. The variation where the advertisement is played to the caller in advance of the call being answered (e.g. in place of ringback) might be performed using Intelligent Network (IN), for example, 3gpp CAMEL, triggers to temporarily inject the audio advertisement by routing the call to a telephony node that plays the advertisement and thereafter (or upon called-party answer or other interrupting events) routes the call to its intended destination.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of."

The invention claimed is:

1. A method, implemented on a computing system having a processor and a memory, for automatically displaying advertisements on an electronic display device at a physical location, comprising:
   receiving, by the processor on a wireless communication port of the computing system, electronic transmissions from personal electronic devices carried by two or more persons at the physical location, wherein the electronic transmissions from the personal electronic devices are received automatically from the two or more persons;
   identifying, by the processor, the two or more persons by using at least a portion of the electronic transmissions to query an electronic database having records associating the portion of the electronic transmissions to the two or more persons;
   determining, by the processor and based on a time at which the electronic transmissions are received, that each of the two or more persons are present at the physical location at a first time;
   generating, by the processor in the memory of the computing system, a set of advertisements associated with a set of products for the physical location;
   identifying, by the processor, a target person of the two or more persons to whom the set of advertisements is to be directed at the first time, wherein the target person is identified based on a database record associated with the target person and indicating a likelihood that the target person would purchase each of the set of products;
   determining, by the processor, a score for the two or more persons, wherein
      the score indicates a likelihood of the two or more persons to detract from each of the set of products, and
      determining the score of the two or more persons excludes the target person;
   determining aggregate scores of the two or more persons excluding the target person for the set of products associated with the set of advertisements, wherein a first aggregate score of the two or more persons excluding the target person for a first advertisement associated with a first product includes the score of each of the two or more persons for the first product;
   transmitting, by the processor from the memory of the computing system to a memory of the electronic display device at the first time, a second advertisement associated with a second product from the set of products only when a second aggregate score of the two or more persons excluding the target person indicates that the two or more persons will not detract from the second product while the second advertisement is displayed to the target person;
   displaying, automatically, the second advertisement on the electronic display device at the physical location while the two or more persons are at the physical location.

2. The method claim 1, wherein determining aggregate scores of the two or more persons includes weighting the aggregate scores based on one or more factors.

3. The method of claim 2, further comprising:
   determining, by the processor, a strength of relationships between the target person and the two or more persons; and
   using, by the processor, the strength of relationships in weighting the aggregate scores.

4. The method of claim 1, further comprising:
   weighting, by the processor, properties of a candidate advertisement that influence a calculation of an aggregate score associated with the candidate advertisement.

5. The method of claim 1, including:
   identifying, by the processor, a mood of the two or more persons and using the mood of the two or more persons as a factor in determining the aggregate scores.

6. The method of claim 1, further comprising:
   identifying, by the processor, a collective mood of the two or more persons and using the identified collective mood as a factor in determining the aggregate scores.

7. The method of claim 1, further comprising:
   maintaining, by the processor in the memory, a record of persons present when an advertisement is displayed for a product; and
   accessing, by the processor, the record as a factor in determining the aggregate scores based on previous recommendations or detractions of the set of product.

8. The method of claim 1, further comprising:
   maintaining, by the processor in the memory, a record of purchases made of a product after displaying an advertisement and the persons present; and
   accessing, by the processor, the record as a factor in determining the aggregate scores based on the recorded purchases made of the set of product.

9. A system for automatically displaying of advertisements on an electronic display device at a physical location, comprising:
   one or more computing nodes having a memory and a processor; and
   a non-transitory computer readable storage medium of the one or more computing nodes having program instructions embodied therewith, the program instructions executable by the processor to cause the computer system to:
      receive, by the processor on a wireless communication port of the computing system, electronic transmissions from personal electronic devices carried by two or more persons at the physical location, wherein the electronic transmissions from the personal electronic devices are received automatically from the two or more persons;
      identify the two or more persons by using at least a portion of the electronic transmissions to query an electronic database having records associating the portion of the electronic transmissions to the two or more persons;

determining, by the processor and based on a time at which the electronic transmissions are received, that each of the two or more persons are present at the physical location at a first time;

generate, in the memory of the computing system, a set of advertisements associated with a set of products for the physical location;

identify a target person of the one or more to whom the set of advertisements is to be directed at the first time, wherein the target person is identified based on a database record associated with the target person indicating a likelihood that the target person would purchase each of the set of products;

determine a score for the two or more persons, wherein the score indicates a likelihood of the two or more persons to detract from each of the set of products, and determining the score of the two or more persons excludes or weights the target person;

determine aggregate scores of the two or more persons, excluding the target person, for the set of products associated with the set of advertisements, wherein a first aggregate score of the two or more persons for a first advertisement associated with a first product excludes the target person and includes the score of each of the two or more persons for the first product;

transmit, from the memory of the computing system to a memory of the electronic display device at the first time, a second advertisement associated with a second product from the set of products only when a second aggregate score of the two or more persons excluding the target person indicates that the two or more persons will not detract from the second product while the second advertisement is displayed to both the target person and the two or more persons;

display, automatically, the second advertisement on the electronic display device at the physical location while the two or more persons are at the physical location.

10. The system of claim 9, wherein the program instructions executable by the processor further cause the computer system to determine aggregate scores of the two or more persons by weighting the aggregate scores based on one or more factors.

* * * * *